(12) United States Patent
Schmitt et al.

(10) Patent No.: US 11,725,781 B2
(45) Date of Patent: Aug. 15, 2023

(54) PRESSURE RELIEF COVER ASSEMBLY

(71) Applicant: Watts Regulator Co., North Andover, MA (US)

(72) Inventors: Craig Schmitt, Peoria, AZ (US); Monica Preston, Glendale, AZ (US); Gilbert Ramirez, Phoenix, AZ (US)

(73) Assignee: Watts Regulator Co., North Andover, MA (US)

( * ) Notice: Subject to any disclaimer, the term of this patent is extended or adjusted under 35 U.S.C. 154(b) by 671 days.

(21) Appl. No.: 16/782,504

(22) Filed: Feb. 5, 2020

(65) Prior Publication Data
US 2020/0256515 A1 Aug. 13, 2020

Related U.S. Application Data

(60) Provisional application No. 62/804,051, filed on Feb. 11, 2019.

(51) Int. Cl.
*F17C 13/04* (2006.01)
*B01D 29/33* (2006.01)
*F17C 13/06* (2006.01)

(52) U.S. Cl.
CPC .............. *F17C 13/04* (2013.01); *B01D 29/33* (2013.01); *B01D 2201/167* (2013.01);
(Continued)

(58) Field of Classification Search
CPC .......... F17C 13/04; F17C 13/06; B01D 29/33; B01D 2201/167; B01D 2201/20;
(Continued)

(56) References Cited

U.S. PATENT DOCUMENTS 163,814 A 5/1875 Sinclaire
171,056 A 12/1875 Sinclaire
(Continued)

FOREIGN PATENT DOCUMENTS

EP 0556506 A1 8/1993
EP 3284526 2/2018
(Continued)

OTHER PUBLICATIONS

European Search Report for European Patent Application No. 20275036.0, dated Jun. 4, 2020, 12 pages.
(Continued)

*Primary Examiner* — Madeline Gonzalez
(74) *Attorney, Agent, or Firm* — Day Pitney LLP; Anthony A. Kassas; Emily Ferriter Russo

(57) ABSTRACT

A lid assembly being attached to a pressure vessel includes a filter access cap having a top portion, a bottom portion, and a tubular portion extending from the top portion to the bottom portion to define a throughhole, the top portion having a radial slot. The lid assembly includes a seal plate assembly connected to the bottom portion of the filter access cap and configured to rotate relative to the filter access cap to assist in releasing a pressure from the pressure vessel, and a relief valve for releasing non-atmospheric pressure when opened. Further, the lid assembly includes a seal stem located in the throughhole, wherein the relief valve is mounted in the seal stem, and an arm operatively engaging the relief valve and having a proximal end pivotally secured to the lid assembly, whereby when the arm is pivoted in a first direction the relief valve can be opened.

14 Claims, 14 Drawing Sheets

(52) U.S. Cl.
CPC .... *B01D 2201/20* (2013.01); *B01D 2201/287* (2013.01); *B01D 2201/303* (2013.01); *B01D 2201/304* (2013.01); *F17C 13/06* (2013.01)

(58) Field of Classification Search
CPC ........ B01D 2201/287; B01D 2201/303; B01D 2201/304; B01D 2201/301; B01D 2201/4015; B01D 35/1475; B01D 35/30; C02F 1/003; C02F 2201/005; C02F 2201/006
USPC ............... 210/120, 180, 472; 137/588
See application file for complete search history.

(56) References Cited

U.S. PATENT DOCUMENTS

| | | |
|---|---|---|
| 2,027,400 A | 1/1936 | Pennebaker |
| 2,313,307 A | 3/1943 | Wilkinson |
| 3,174,623 A | 3/1965 | Sloan |
| 3,669,148 A | 6/1972 | Burkhalter et al. |
| 3,746,171 A | 7/1973 | Thomsen |
| 3,854,902 A | 12/1974 | Kalen |
| 3,969,446 A | 7/1976 | Franklin, Jr. |
| 3,984,325 A | 10/1976 | Rosaen |
| 4,559,138 A | 12/1985 | Harms, II |
| 4,693,823 A | 9/1987 | Matchett |
| 4,919,849 A | 4/1990 | Litz et al. |
| 4,989,636 A | 2/1991 | Hunter et al. |
| 5,041,219 A | 8/1991 | Strand et al. |
| 5,045,187 A | 9/1991 | Suchanek |
| 5,076,918 A | 12/1991 | Foust et al. |
| 5,141,637 A | 8/1992 | Reed et al. |
| 5,171,442 A | 12/1992 | Nakshbend |
| 5,328,609 A | 7/1994 | Magnusson et al. |
| 5,545,319 A | 8/1996 | Hart et al. |
| 6,042,729 A | 3/2000 | Chau |
| 6,090,285 A | 7/2000 | Chau |
| 6,231,763 B1 | 5/2001 | Chau |
| 6,283,153 B1 | 9/2001 | Brisco et al. |
| 6,402,944 B1 | 6/2002 | Vaughan |
| 6,447,678 B2 | 9/2002 | Chau |
| 7,186,338 B2 | 3/2007 | Boisvert |
| 8,349,183 B2 | 1/2013 | Field |
| 9,527,015 B2 | 12/2016 | Chau |
| 9,815,725 B2 | 11/2017 | Rice |
| 10,207,206 B2 | 2/2019 | Chau |
| 2001/0008218 A1 | 7/2001 | Chau |
| 2001/0035510 A1 | 11/2001 | Oh |
| 2007/0181191 A1 | 8/2007 | Wittig et al. |
| 2010/0170857 A1 | 7/2010 | Williams et al. |
| 2011/0108489 A1 | 5/2011 | Fritze et al. |
| 2013/0056402 A1 | 3/2013 | Chau |
| 2014/0048469 A1 | 2/2014 | Wilder et al. |
| 2014/0263054 A1 | 9/2014 | Julos et al. |
| 2016/0016817 A1 | 1/2016 | Chau |
| 2016/0096750 A1 | 4/2016 | Chau |
| 2018/0259982 A1 | 9/2018 | Halimi |
| 2019/0070535 A1* | 3/2019 | Patterson ................ C02F 1/001 |
| 2020/0353382 A1 | 11/2020 | Chau |

FOREIGN PATENT DOCUMENTS

| | | |
|---|---|---|
| EP | 3647274 | 5/2020 |
| JP | H09174050 | 8/1997 |
| WO | 01/26772 | 4/2001 |
| WO | 2006/031838 | 3/2006 |
| WO | 2013/063566 | 5/2013 |
| WO | 2014/004607 | 1/2014 |
| WO | 2014/053956 | 4/2014 |
| WO | 2018223276 A1 | 12/2018 |
| WO | 2019148415 A1 | 8/2019 |

OTHER PUBLICATIONS

European Search Report for European Patent Application No. 20275035.2 dated Jun. 2, 2020, 13 pages.
European Search Report for European Patent Application No. 20275037.8 dated Jun. 8, 2020, 8 pages.
Communication pursuant to Article 94(3) EPC, issued in corresponding European patent application No. 20275036.0, dated Jul. 8, 2021, 5 pages.
Chandler Systems; Drop Water Management System and Mobile App User Guide; Jan. 2020; 40 pages.
Examination Report issued in corresponding European patent application No. 20275035.2, dated Aug. 7, 2021, 5 pages.

* cited by examiner

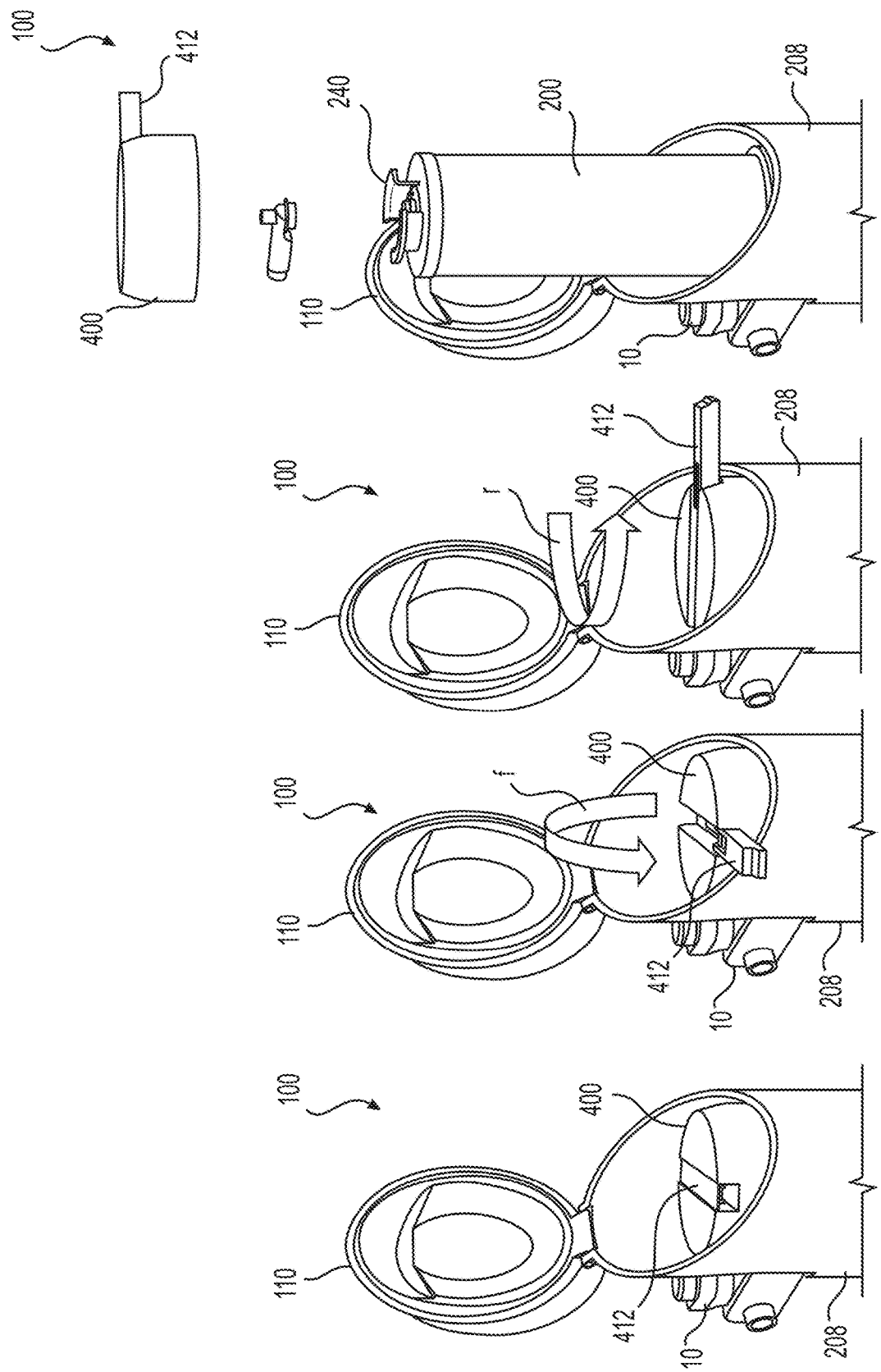

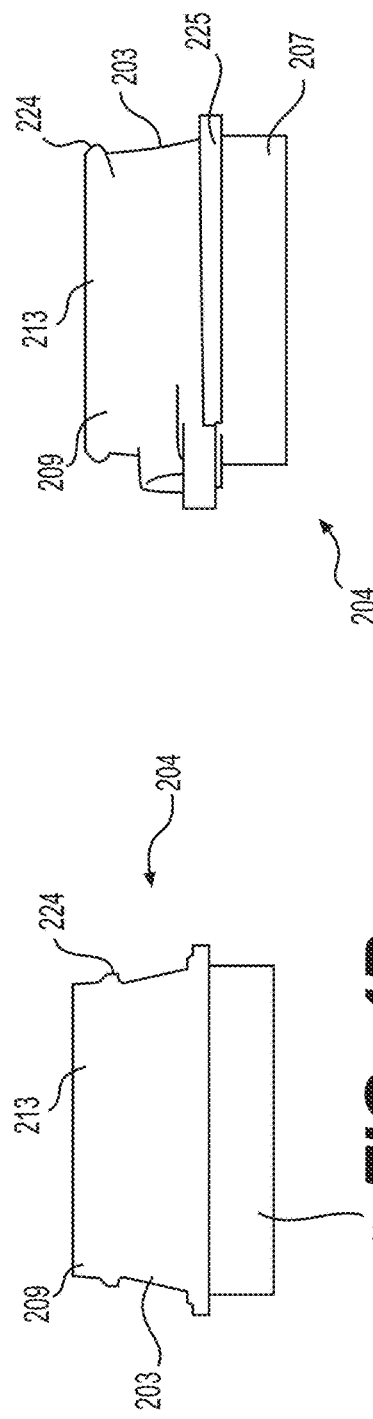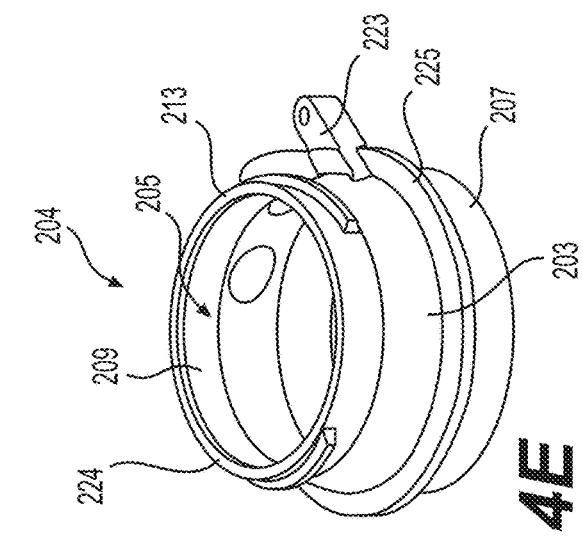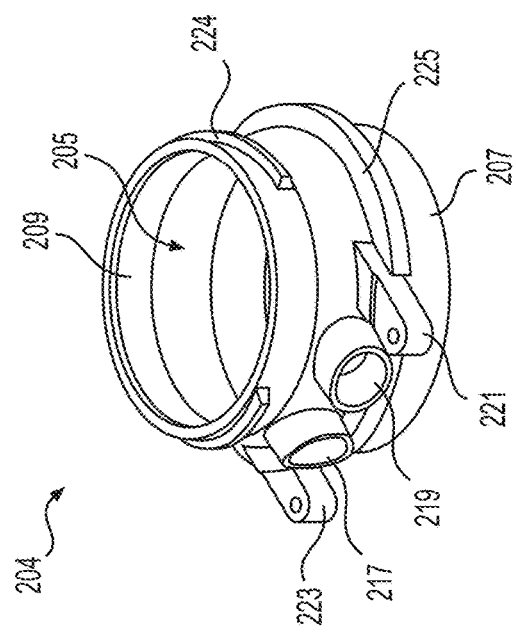

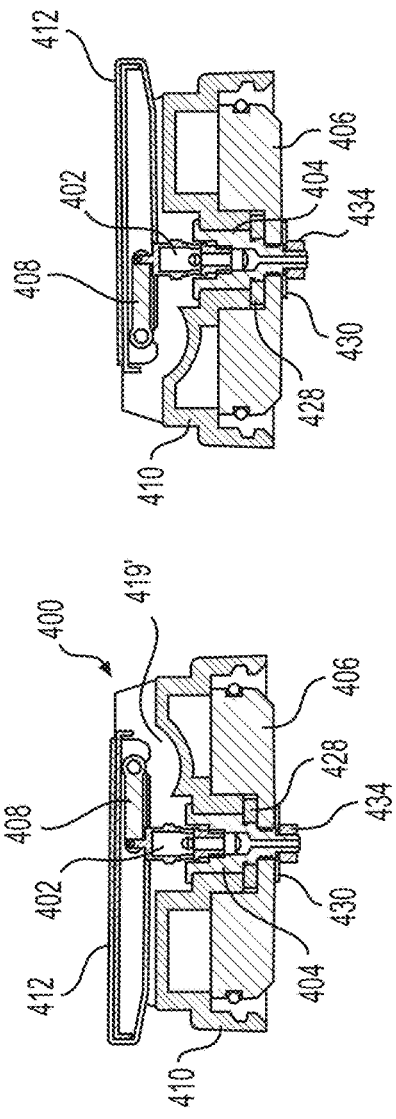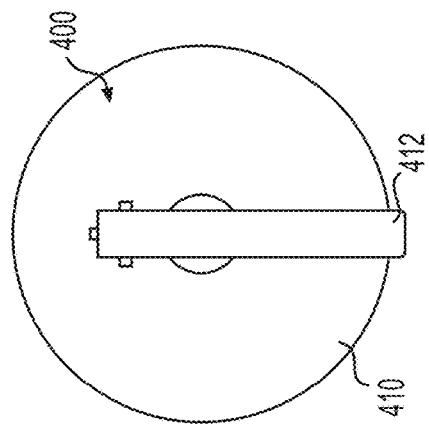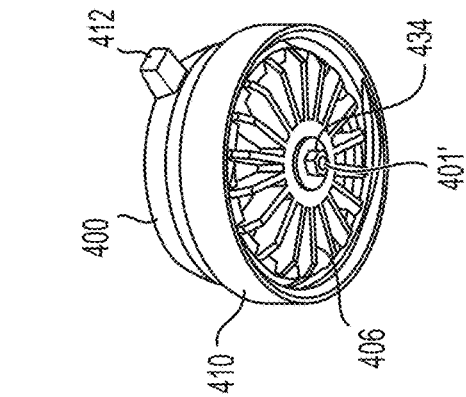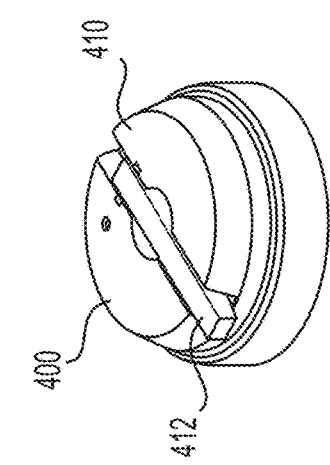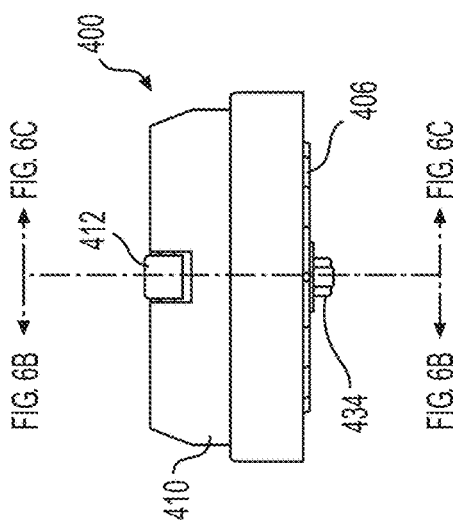

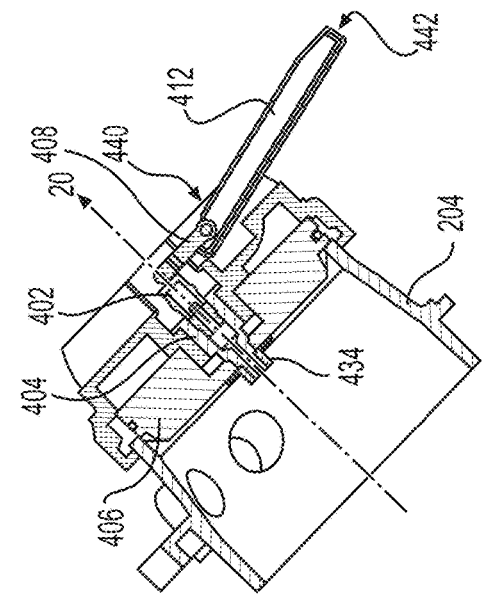
FIG. 7C
FIG. 7E
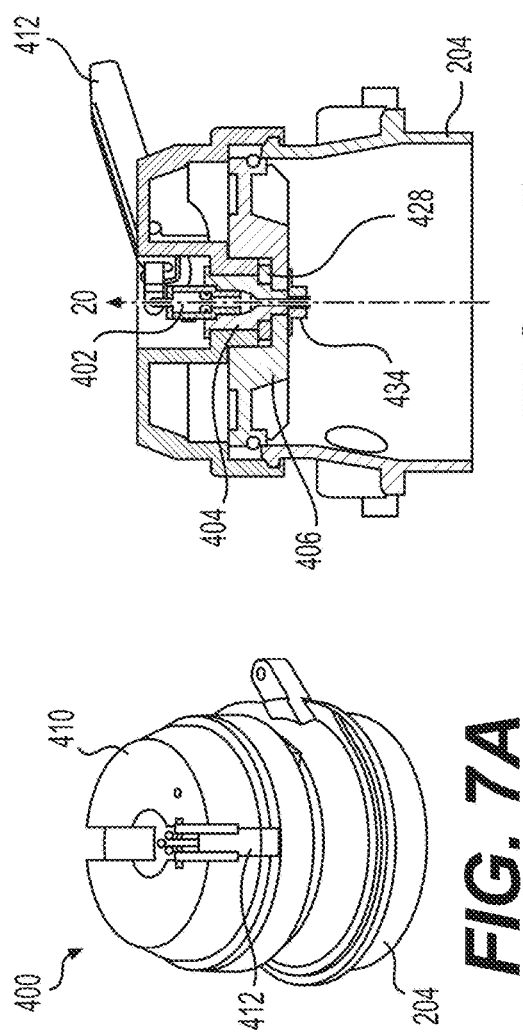
FIG. 7B
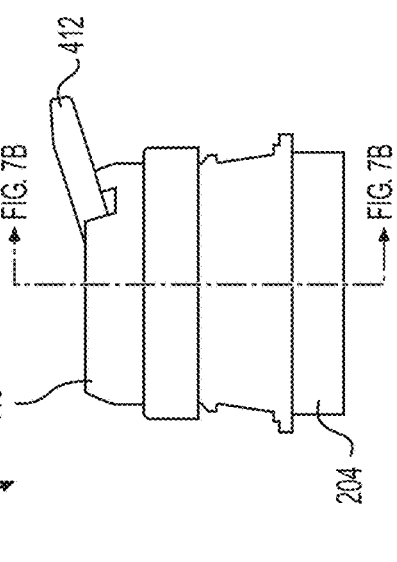
FIG. 7A
FIG. 7D

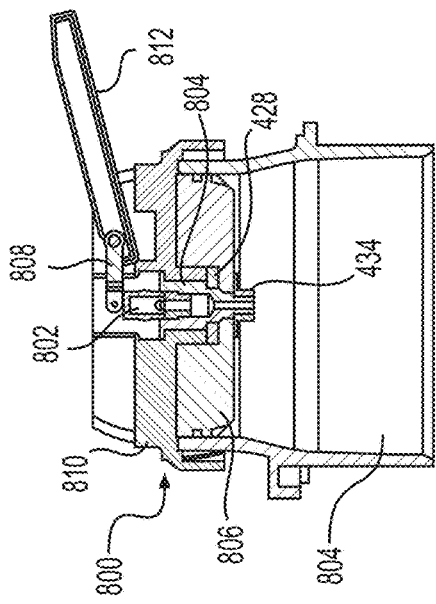
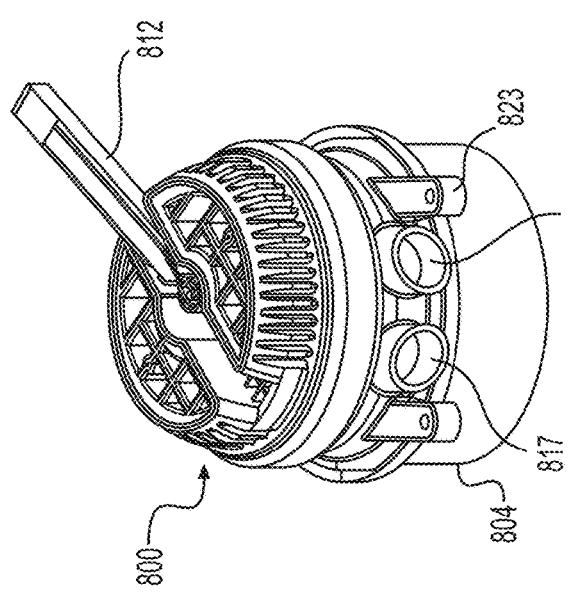
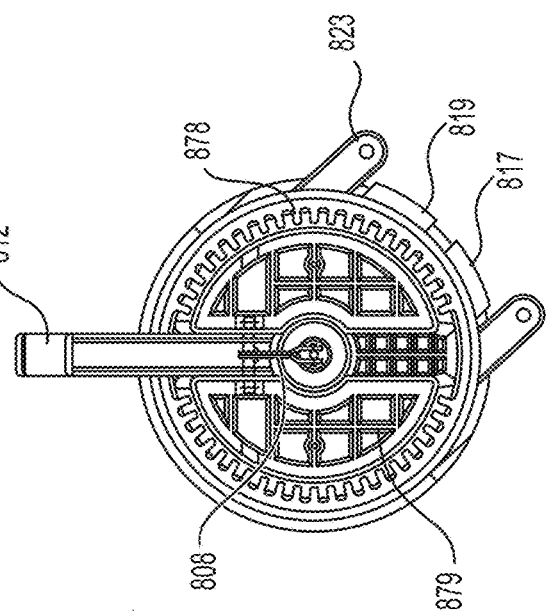
FIG. 10B
FIG. 10C
FIG. 10A

PRESSURE RELIEF COVER ASSEMBLY

CROSS-REFERENCE TO RELATED APPLICATIONS

This application claims priority to U.S. Provisional Application No. 62/804,051, entitled "Filtration System," filed on Feb. 11, 2019, which is hereby incorporated by reference in their entirety.

FIELD OF THE SUBJECT TECHNOLOGY

The disclosure relates to a water filtering system. More particularly, the disclosure relates to a pressure release lid assembly for a whole house point of entry (POE) water filtering system.

BACKGROUND OF THE SUBJECT TECHNOLOGY

A whole house water filter is a filtration system capable of filtering all the water that enters a house from an external water network. These systems are also called Point Of Entry (POE) systems because such filters are usually installed before the water reaches any points of use such as the water heater, thus filtering all the water including both the cold and the warm water. Therefore, every time a faucet is opened, filtered water flows. The filtered water is delivered to the bathrooms, washing machine, and the rest of the house as well. POE systems are designed to remove various contaminants keeping in mind various parameters such as water flow, filter selection to accomplish blocking of different contaminants, filter longevity, reliability, ease of maintenance and the like. With proper selection and maintenance, a POE system improves the quality of the household water.

Filtration systems often have one or more vessels under pressure. A snap ring to hold a lid or a large multi-turn threaded engagement is traditionally utilized to maintain the pressure during operation. Such systems can be cumbersome when access to the interior is required. It can also be difficult to release the pressure in order to ease the access operation.

SUMMARY

In some embodiments, a lid assembly being attached to a pressure vessel is provided. The lid assembly can include a filter access cap having a top portion, a bottom portion, and a tubular portion extending from the top portion to the bottom portion to define a throughhole. The top portion can have a radial slot. Further, the lid assembly includes a seal plate assembly connected to the bottom portion of the filter access cap. The seal plate assembly freely rotates relative to the filter access cap to assist in releasing a pressure from the pressure vessel and access to the interior. The lid assembly has a relief valve for selectively releasing the interior non-atmospheric pressure. In addition, the lid assembly includes a seal stem located in the throughhole. The relief valve is mounted in the seal stem. Further, the lid assembly can include an arm operatively engaging the relief valve and having a distal end pivotly secured to the lid assembly. At times the arm is pivoted in a first direction, the relief valve opens and a proximal end of the arm extends further outwardly from an axis such that torque applied through the arm to the lid assembly is increased to ease rotation of the lid assembly.

In some embodiments, the arm is located in the radial slot. The lid assembly can include an arm weldment configured to connect the arm to the relief valve.

In some embodiments, the arm is capable of rotating the lid assembly 5 degrees to 365 degrees with respect to the axis defined along the tubular portion. In other embodiments, the arm is capable of actuating from a closed position, being normal to the axis, to the relieve position, being parallel to the axis.

The tubular portion may step down to a narrow diameter portion to form a shoulder that an upper flange of the seal stem rests upon. Preferably, the top portion of the filter access cap has a top surface having a top edge, a bottom surface having a bottom edge, and a circumferential surface extending from the top edge to the bottom edge. The circumferential surface can include a plurality of openings configured to increase a strength of the lid assembly. In some embodiments, the top portion of filter access cap has a ribs and openings defined between the top surface and the bottom surface. The plurality of ribs are configured to increase a strength of the lid assembly.

The subject technology is also directed to a filtration system having a pressure vessel having an opening and a filter cartridge received in the pressure vessel. The filter cartridge is adapted to be inserted into and removed from the pressure vessel through the opening. The filtration system includes a lid assembly sealing the opening of the pressure vessel when secured to the pressure vessel. Rotational interference-fit structures secure the lid assembly to the pressure vessel when engaged. Rotation of the lid assembly in a first direction about an axis with respect to the pressure vessel engages the rotational interference-fit structures while rotation in a second direction disengages the rotational interference-fit structures. Further, the filtration system can include a relief valve coupled to the lid assembly for selectively releasing non-atmospheric pressure from the pressure vessel when opened. The filtration system can also include an arm operatively engaging the relief valve and having a distal end rotatably secured to the lid assembly. When the arm is pivoted in a first direction, the relief valve opens and a distal end of the arm extends further outwardly from the axis such that torque applied through the arm to the lid assembly is increased to ease rotation of the lid assembly.

In some embodiments, the rotational interference-fit structures comprise screw threads. The arm may be directly or indirectly connected to the relief valve for actuation. Further, the filtration system can include a manifold attached to the pressure vessel for controlling flow into the pressure vessel. The pressure vessel can include a bottom housing, a middle housing being attached to the bottom housing and configured to contain the filter cartridge, and a top housing being attached to the lid assembly.

The lid assembly of the filtration system may include a filter access cap having a top portion, a bottom portion, and a tubular portion extending from the top portion to the bottom portion to define a throughhole. The top portion can have a radial slot for the arm. Further, the lid assembly can include a seal plate assembly connected to the bottom portion of the filter access cap and configured to rotate relative to the filter access cap to assist in releasing a pressure from the pressure vessel and a seal stem located in the throughhole. The relief valve can be mounted in the seal steam.

In some embodiments, at times the filtration system is in a closed position, the arm allows the relief valve to be closed. At times the filtration system is in a relieve position, the arm is manually pressed to act as a lever and open the relief valve and, thereby, relieve the pressure. When the filtration system is in a removal position, the arm is configured to act as a handle to remove the lid assembly from the top housing.

The filtration system can include an arm weldment having a proximal end rotatably pinned to the distal end of the arm and a distal end rotatably pinned to the pressure relief valve. In some embodiments, the radial slot has a first side and a second side of a same length. The arm can be longer than the same length. In some embodiments, at times the filtration system is in the closed position, the proximal end of the arm is in the first side of the radial slot and the proximal end of the arm weldment is in the second side of the radial slot so that the arm weldment does not exert a force on the pressure relief valve. At times the filtration system is in the relieve position, the proximal end of the arm extends out of the second side of the radial slot so that when manually pressed, the arm weldment pulls on the relief valve and, thereby, the pressure relief valve opens.

The radial slot may have a hollow for clearance of movement of the distal end of the arm. The rotational interference-fit structures can include a plurality of inner slots in the filter access cap for capturing a plurality of outer bosses on the pressure vessel.

In some embodiments, each inner slot has an angled opening, a capture area and a transition area extending between the angled opening and the capture area. Each outer boss is sized to pass through the angled opening for retention in the capture area as well as having a banking surface to engage the angled opening to provide lifting force when removing the filter access cap.

The subject technology is also directed to a filtration system including an elongated pressure vessel having an opening. A lid assembly selectively seals the opening of the pressure vessel. The lid assembly includes a filter access cap forming a radial slot and having rotational interference-fit structures securing the lid assembly to the pressure vessel. The lid assembly also includes a relief valve configured to selectively release non-atmospheric pressure from the pressure vessel and an arm coupled to the relief valve. In a relieve position, the arm can actuate the relief valve to open and a proximal end of the arm can rotate to press against sidewalls of the radial slot to release the rotational interference-fit structures and remove the lid assembly from the elongated pressure vessel. Preferably, a plate assembly connects to the filter access cap and carries an o-ring to seal the lid assembly to the elongated pressure vessel but can rotate relative to the filter access cap to ease removing the lid assembly from the pressure vessel.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

The disclosure will be more fully understood by reference to the following detailed description in conjunction with the attached drawings, in which:

FIGS. 3A-3D illustrate a sequence of steps for removing a filter cartridge of a filter system in accordance with the subject technology;

FIGS. 4B-4E illustrate a top housing of the pressure vessel of FIG. 4A, according to certain embodiments;

FIGS. 6A-6F illustrate various views of another lid assembly in a closed position, according to certain embodiments;

FIGS. 7A-7E illustrate various views of still another lid assembly in a removal position, according to certain embodiments;

FIGS. 10A-10C illustrate various views of a lid assembly in a removal position, according to certain embodiments.

DETAILED DESCRIPTION

Figure 1A:
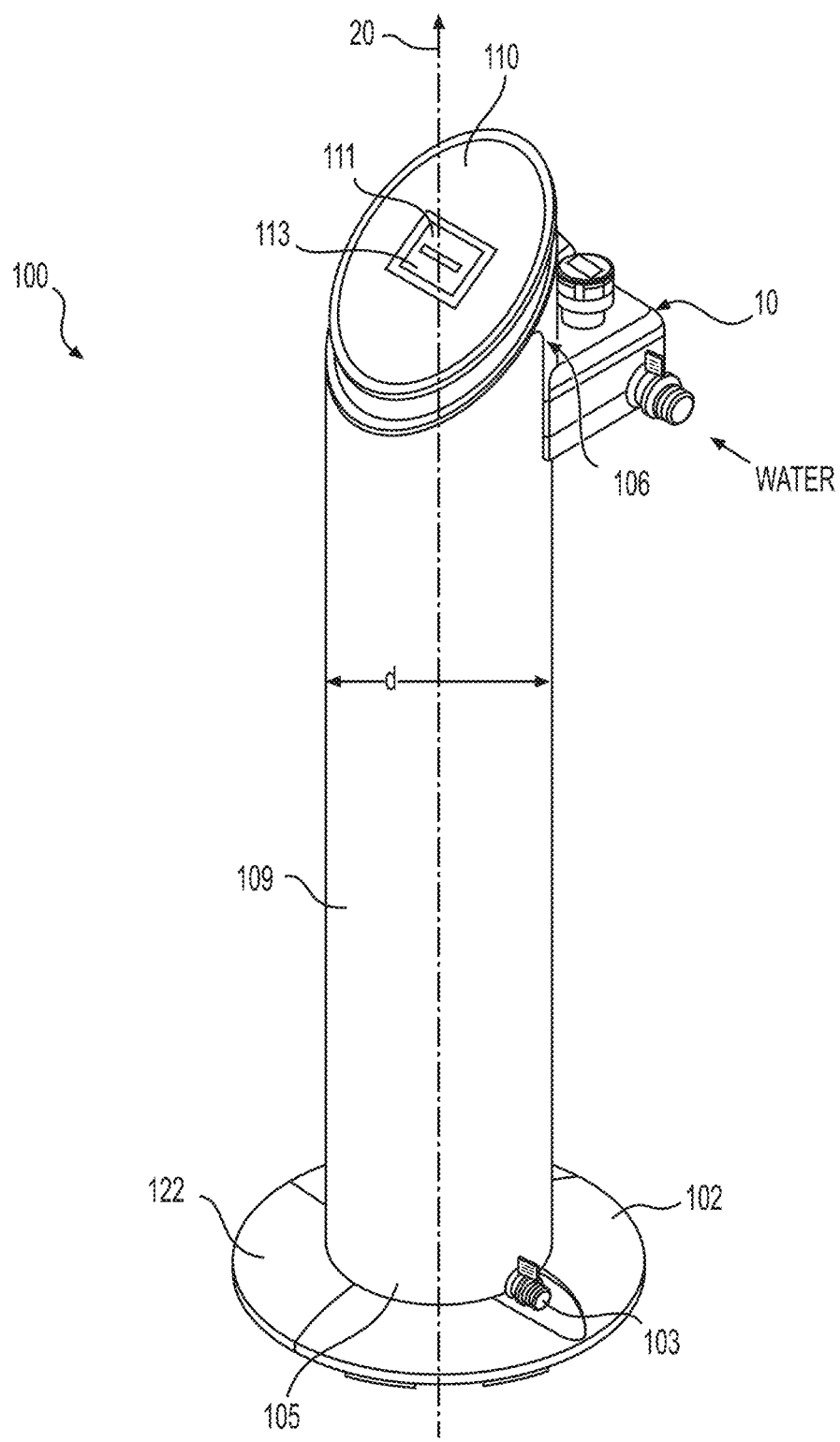
FIG. 1A illustrates an isometric view of a filtration system, according to certain embodiments.

In the following detailed description, numerous specific details are set forth in order to provide a thorough understanding of the embodiments of the present disclosure. It will be understood by those of ordinary skill in the art that these embodiments may be practiced without some of these specific details. In other instances, well-known methods, procedures, components and structures may not have been described in detail so as not to obscure the described embodiments.

Prior to describing at least one embodiment in detail, it is to be understood that these are not limited in their application to the details of construction and the arrangement of the components set forth in the following description or illustrated in the drawings. Also, it is to be understood that the phraseology and terminology employed herein are for the purpose of description only and should not be regarded as limiting. Directional indications such as upward, downward, right, left and the like are used with respect to the figures and not meant in a limiting manner.

POE systems typically have one or more vessels under pressure. To release pressure in a filtration system, a snap ring to hold a lid or a large multi-turn threaded engagement is utilized to maintain the pressure during operation. However, relieving the pressure from such systems can be cumbersome when access to the interior is required.

One of the advantages of the present disclosure is an easier access to a pressure vessel for maintenance. Specifically, the present disclosure provides an easier access to an occasional user that does not have experience with pressure vessels. In one embodiment, a filtration system provides activation of the pressure relief at times the lid is about to be removed.

Figure 1B:
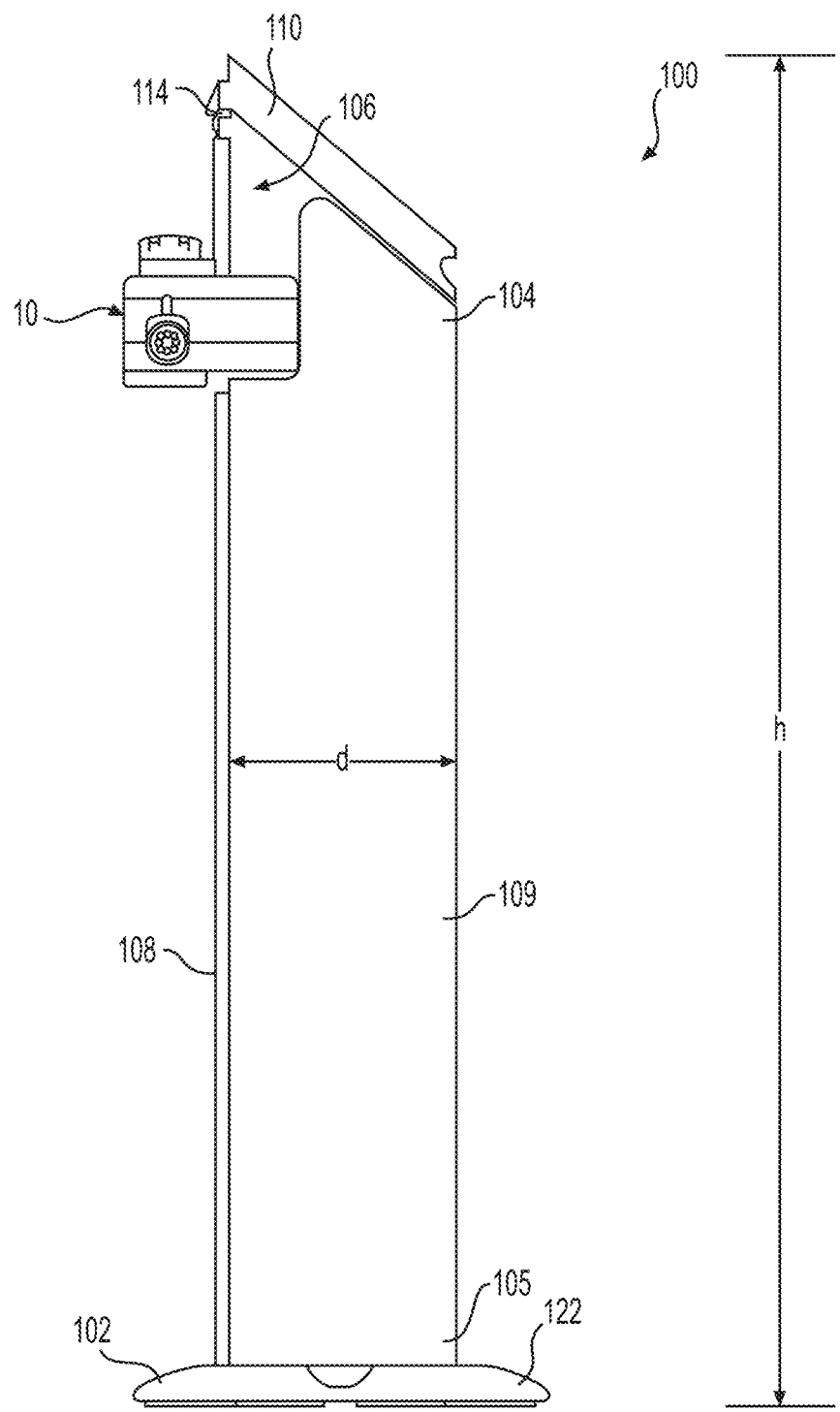
FIG. 1B illustrates a side view of a filtration system, according to certain embodiments.

FIGS. 1A-1B illustrate a filtration system 100, according to certain embodiments. The filtration system 100 is sized and configured for easy maintenance and reliable operation. The filtration system 100 includes a cylindrical pressure vessel 106 which is stabilized in an upright position by a base 102. The cylindrical pressure vessel 106 is wrapped in a stainless steel cover 109 for a neat and clean appearance. The base 102 can include an outer portion 122 configured to extend radially from the pressure vessel 106 and a recessed inner portion (not explicitly shown) for receiving a mating end 105 of the pressure vessel 106. The height "h" of the pressure vessel 106 extends along an axis 20 and is variable but typically between 10 cm to 200 cm with an external diameter "d" of between 5 cm to 50 cm. In some embodiments, the pressure vessel 106 has a height of 112 cm and an external diameter of 20 cm. In another embodiment, the pressure vessel 106 has a height of 127 cm and an external diameter of 27 cm.

Figure 2:
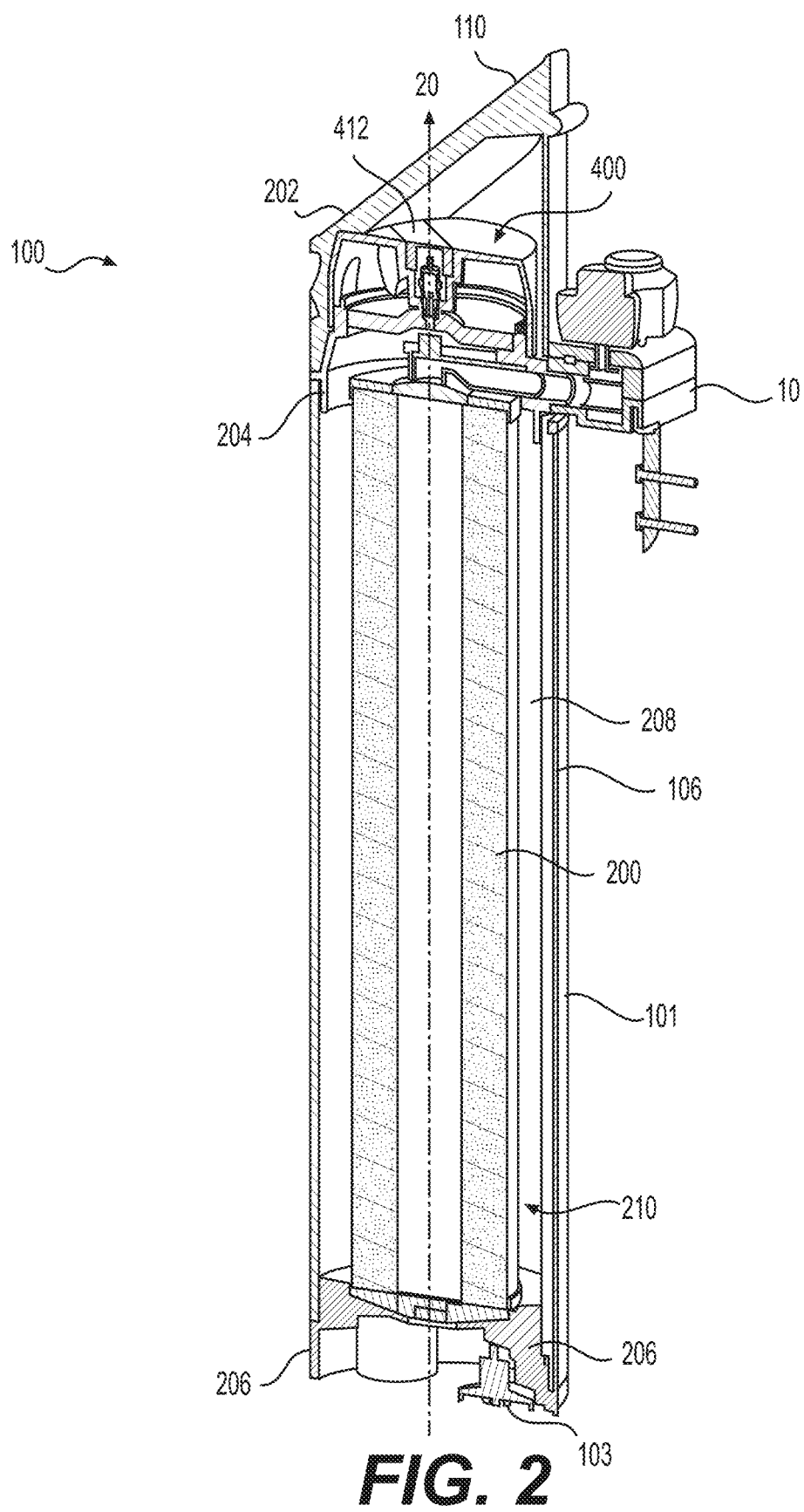
FIG. 2 illustrates cross-sectional view of a filtration system, according to certain embodiments.

A top cover 110 provides access to one or more filter cartridges 200 (FIGS. 2 and 3) inside the pressure vessel 106. The top cover 110 moves between an open position and a closed position. FIGS. 1A-1B and 2 show the top cover 110 in a closed position. The open position of the top cover 110 is shown in FIG. 3D. The filtration system 100 includes a lower fitting 103 as a drain port.

The top cover 110 includes a touch screen controller 111. Preferably, the controller 111 not only displays information but provides control of the manifold assembly 10 among other features. The manifold assembly 10 controls flow through the filtration system 100 and may include sensors to provide flow information to the touch screen controller 111.

The controller 111 and touch screen 113 are integrated with the top cover 110. The electronics (not shown) for the controller 111 may be housed remotely or under the top cover 110. The controller 111 may communicate through wired and/or wireless channels. A top portion 104 of the filtration system 100 includes a cover hinge 114 that supports the top cover 110. A vertical frame 108 extends between the top portion 104 and the base 102 to retain the stainless cover 109.

Figure 4A:
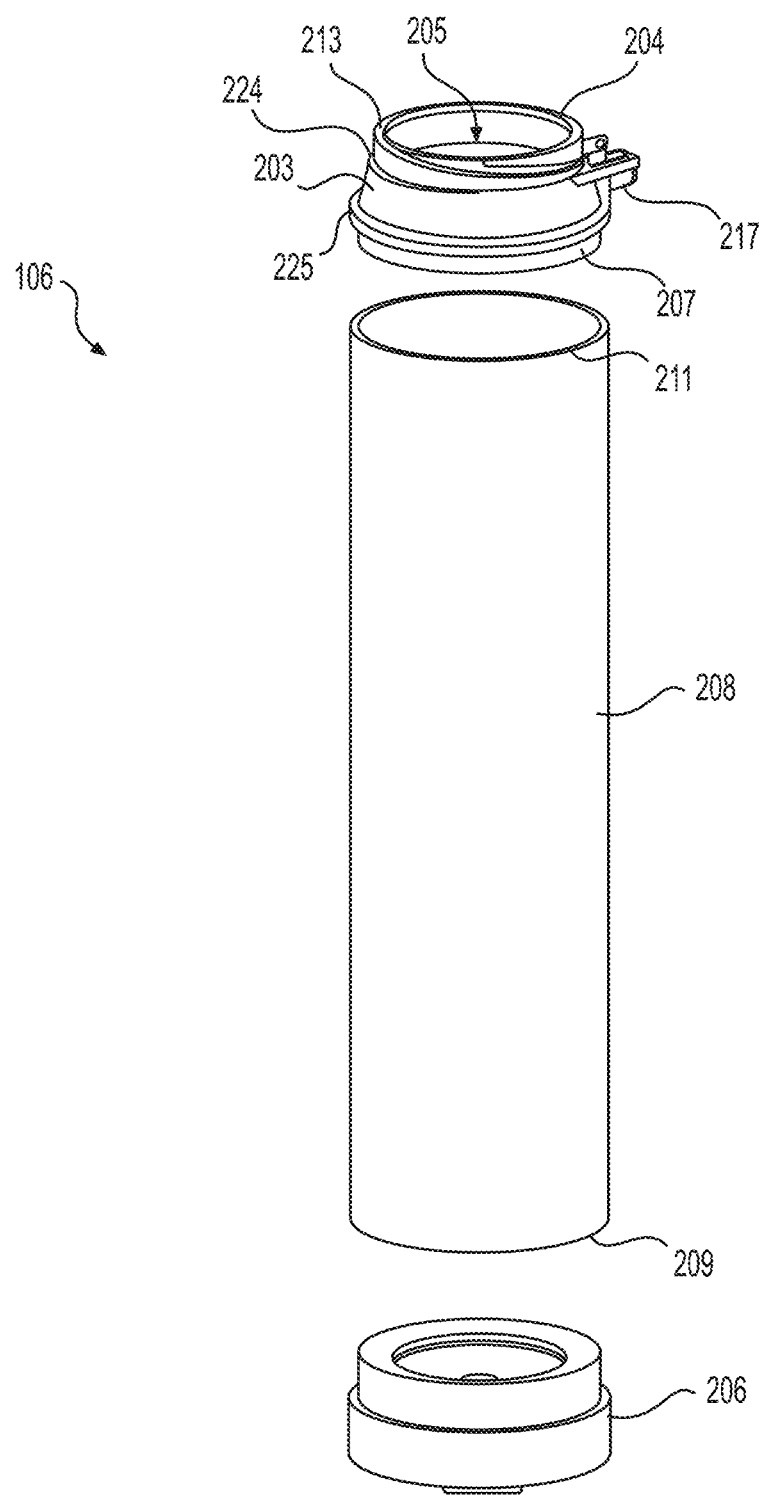
FIG. 4A illustrates an exploded view of a pressure vessel, according to certain embodiments.

FIG. 2 illustrates a cross-sectional view of the filtration system 100. Referring additionally to FIG. 4A, the pressure vessel 106 has an opening 205 for receiving a filter cartridge 200. The pressure vessel 106 has a bottom housing 206, a middle housing 208, and a top housing 204. The middle housing 208 extends from the top housing 204 to the bottom housing 206. The bottom housing 206 is connected to the drain port 103. The middle housing 208 is attached to the bottom housing 206 on a lower end 209 and to the top housing 204 on an upper end 211. The bottom housing 206 is preferably PVC welded to the middle housing 208. In an alternative embodiment, the bottom housing 206 may be bonded to the middle housing 208 with an acrylic adhesive. Similarly, the top housing 204 may be sealed to the middle housing 208 with a PVC weld, acrylic adhesive and the like. The pressure vessel 106 can have any geometrical shape to accommodate the filter cartridge 200 inside. Accordingly, filter cartridges 200 are adapted to be inserted into and removed from the pressure vessel 106 through the opening 205 as shown in FIG. 3D.

The top housing 204 can also have any geometrical shape. The top housing 204 has a top portion 213, a middle portion 203, and a bottom portion 207. The bottom portion 207 of the top housing 204 sealingly attaches to the upper end 211 of the middle housing 208 so that a flange 225 rests on the upper end 211. Further, the lower end 209 of the middle housing 208 sealingly attaches to the bottom housing 206. The top housing 204 has ports 217, 219 (see FIG. 4D) in fluid communication with the filter cartridge 200 disposed inside the pressure vessel 106. The ports 217, 219 are configured to connect to the manifold assembly 10. The pressure vessel 106 can be made of any materials, e.g., fiber glass, metal, or any plastic. Preferably, the top housing 204 and/or the bottom housing 206 can be made by injection molding.

Still referring to FIG. 2, the filtration system 100 includes a lid assembly 400 attached to the pressure vessel 106 by the top housing 204. The lid assembly 400 selectively seals the opening 205 (shown in FIG. 4A) of the pressure vessel 106 when secured to the pressure vessel 106. The top housing 204 and the lid assembly 400 have rotational interference-fit structures 224, 427 so that the lid assembly 400 is secured to the pressure vessel 106 when engaged (rotational interference-fit structure 427 of the lid assembly 400 is shown in FIG. 5B). Accordingly, the rotation of the lid assembly 400 in a first direction (e.g., clockwise) about an axis 20 with respect to the pressure vessel 106 engages the rotational interference-fit structures 224, 427 while the rotation of the lid assembly 400 in a second direction (e.g., counterclockwise) about the axis 20 with respect to the pressure vessel 106 disengages the rotational interference-fit structures 224, 427.

FIGS. 4B-4E illustrate various views of the top housing 204 in isolation, according to certain embodiments. As shown, the rotational interference-fit structure 224 of the top housing 204 are threads which secure the lid assembly 400 to the top housing 204. Further, the bottom portion 207 of top housing 204 can be threaded to the middle housing 208 to create the fluid tight interior 210 within the pressure vessel 106. The top housing 204 also has manifold mounts 221, 223 for supporting the manifold assembly 10.

Figure 5A:
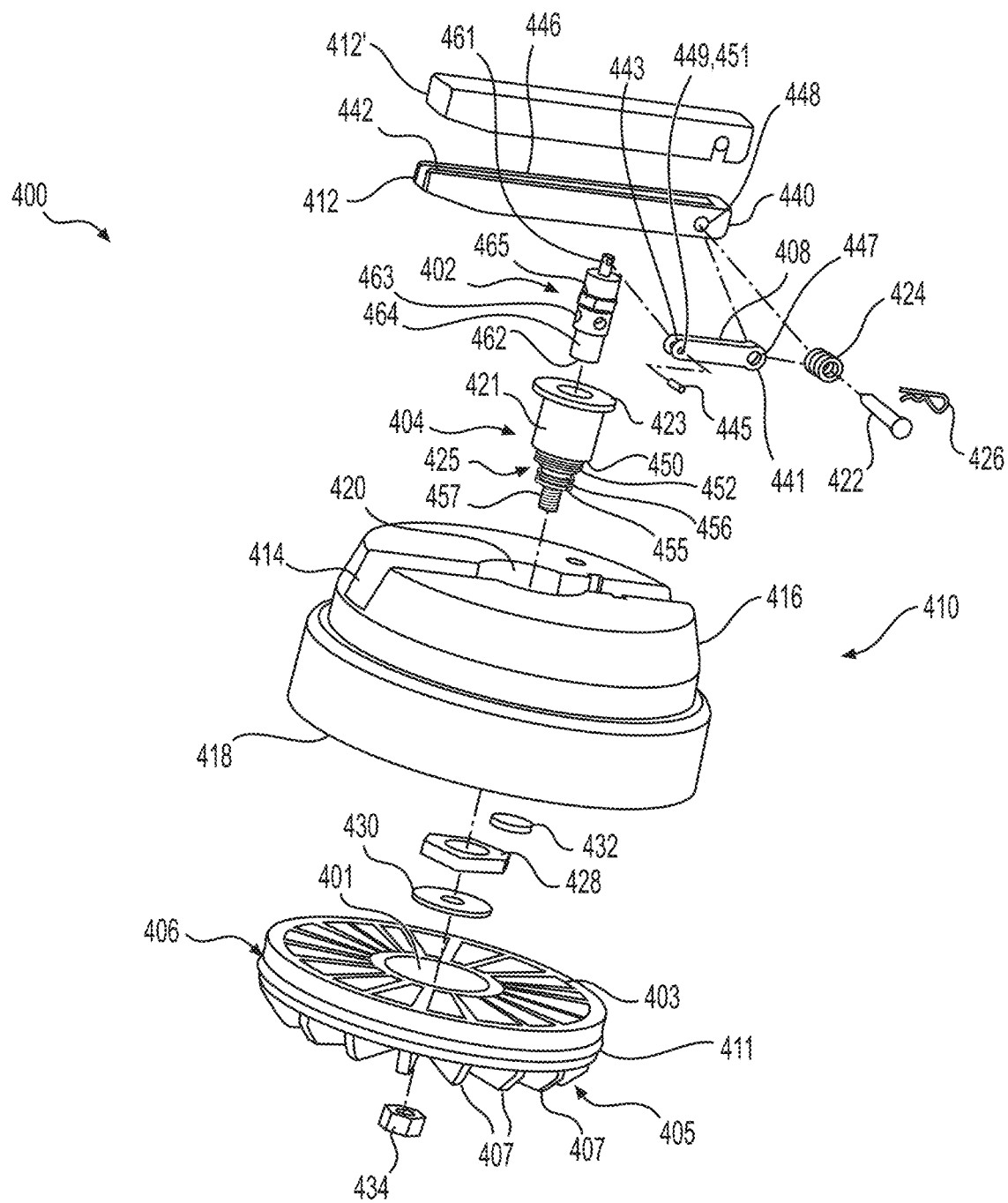
FIG. 5A illustrates an exploded view of a lid assembly, according to certain embodiments.
Figure 5B:
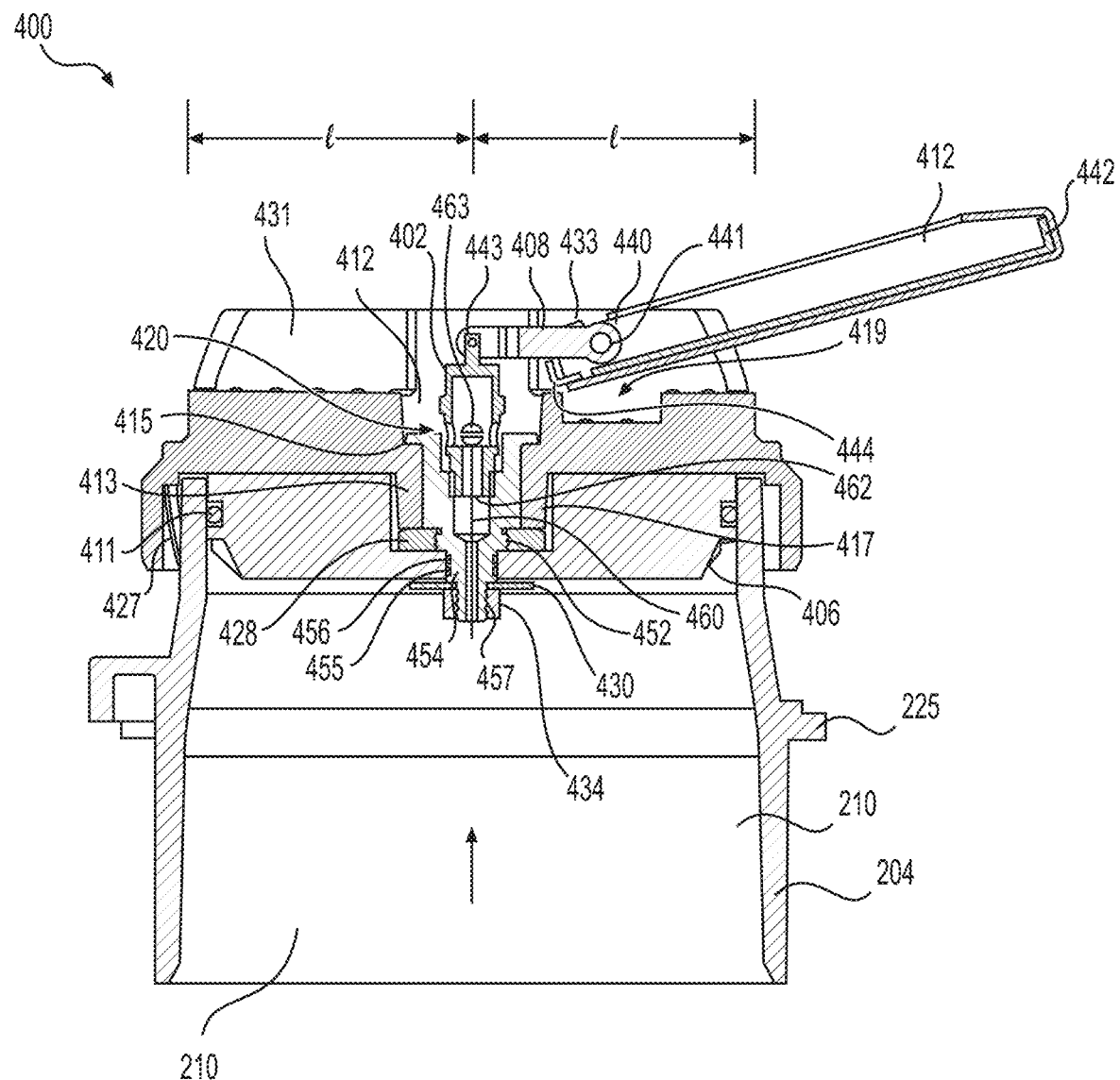
FIG. 5B illustrates a cross sectional view of the lid assembly of FIG. 5A, according to certain embodiments.

FIGS. 5A-5B illustrate the lid assembly 400 in exploded and cross-sectional views, respectively. The lid assembly 400 includes a circular filter access cap 410 having a top portion 416 and a bottom portion 418. The bottom portion 418 sealingly couples to the top housing 204. A central tubular portion 417 (see FIG. 5B) extends from the top portion 416 to the bottom portion 418 to define a throughhole 420. The central tubular portion 417 steps down to a narrow diameter portion 413 to form a shoulder 415. The top portion 416 has sidewalls 429 forming a radial slot 414 extending from the central tubular portion 417. The radial slot 414 has a first side 431 and a second side 433 having a same length "l". The second side 433 of the radial slot 414 forms a hollow 419.

The lid assembly 400 also includes a seal plate assembly 406 connected to the bottom portion 418 of the filter access cap 410. The seal plate assembly 406 is mounted to rotate relative to the filter access cap 410 to assist in removing the lid assembly 400 and releasing pressure from the pressure vessel 106. The seal plate assembly 406 has an upper main plate 403 coupled to a lower wheel-like portion 405. The upper main plate 403 may be solid with only a central hole 401 or more of a hub-and-spoke design as shown. The wheel-like portion 405 includes depending radial fins 407 for structural strength to prevent bow under high pressure. The seal plate assembly 406 also includes an outer o-ring 411 for sealing against the top housing 204.

The lid assembly 400 includes a seal stem 404 located in the throughhole 420. The seal stem 404 has a cup-shaped main body 421 with an upper flange 423 and a narrow lower end 425 so that a horizontal banking surface 450 is created intermediate the main body 421 and the lower end 425. The lower end 425 has an upper threaded portion 452 and a middle segment 454 that carries two o-rings 455, 456 for sealing. The lower end 425 also has a distal narrowest threaded segment 457. An axial release passageway 460 is formed through the seal stem 404.

When assembled, the flange 423 rests against the shoulder 415 and the lower end 425 extends out of the throughhole 420 so that the axial release passageway 460 is in fluid communication with the interior 210. A stem nut 428 threads onto the upper threaded segment 452 to retain the seal stem 404 in narrow diameter portion 413 against the shoulder 415. The seal plate assembly 406 is fit on to the middle segment 454 and a washer 430 is placed on the lower end 425. A hex nut 434 screws on to the distal threaded segment 457 so that the seal plate assembly 406 is captured around the middle segment 454. As a result, the seal plate assembly 406 is mounted to freely spin between the stem nut 428 and the washer 430.

The lid assembly 400 also includes a relief valve 402 for selectively releasing non-atmospheric pressure of the pressure vessel 106 when the lid assembly 400 is opened. In one embodiment, the relief valve 402 is a brass air safety valve with soft seat valve type available from W. W. Grainger, Inc. of Lake Forest, Ill. (also see www.grainger.com) and from the Grainger catalog as item number 5A709, manufacturer model number ST25-1A150 and UNSPEC number 40141604. The relief valve 402 is mounted in the seal stem 404 which is located in the throughhole 420.

The relief valve 402 is normally closed but has a poppet 461 that when pulled upward, opens the relief valve 402. The relief valve 402 has a distal inlet 462 aligned with the axial release passageway 460 and a plurality of upper outlets 463 in fluid communication with ambient air via the throughhole 420. When the relief valve 402 is open, fluid can flow from a distal inlet 462 to the outlets 463. The relief valve 402 has a threaded lower end 464 covered with thread sealant but could also press-fit into the seal stem 404 and the like. When threaded, the seal stem 404 has mating internal threads (not explicitly shown). A hexagonal section 465 of the relief valve 402 allows turning the relief valve with a wrench for assembly.

Still referring to FIGS. 5A and 5B, the lid assembly 400 includes a pivoting actuator lock arm 412 for selectively opening the relief valve 402. The arm 412 is longer than the length "l" of the first second sides 431, 433 for leverage. The lid assembly 400 includes an arm cover 412' to cover the arm 412. The arm 412 has a distal end 440 which is rotatably secured to the relief valve 402 by an arm weldment 408. The arm 412 also has a push bracket 444 on the distal end 440. The push bracket 444 may be integrally or separately formed with the arm 412 or the arm cover 412'. The arm 412 also forms a channel 446.

The arm weldment 408 has a proximal end 441 that forms a passage 447 that aligns with opposing holes 448 formed in the distal end 440 of the arm 412. A pin 422 passes through the holes 448 and passage 447 and is held in place by a cotter pin 426 with centered with spacers 424. A distal end 443 of the arm weldment 408 splits into opposing sides 449, each with a hole 451, for rotatably connecting to the relief valve 402 by a pin 445, which passes through a hole 451 in the poppet 461. Generally, viewed from above, the distal end 443 of the arm weldment 408 is Y-shaped.

When assembled, the arm 412 can be pivoted between a closed position with the handle in a closed direction or orientation (FIGS. 6A-6F) and a relieve position with the handle 412 in a relieve direction or orientation (FIGS. 7A-7E). FIGS. 6F and 7A-7E illustrate the lid assembly 400 of FIGS. 5A-5B with a minor difference in the geometrical shape of hollow 419. The hollow 419' has an arctic shape compare to the square shape of hollow 419 of FIGS. 5A-5B.

In the relieve position, the relief valve 402 can be opened to release internal pressure by using the arm 412 to mechanically activate the relief valve 402 as the arm 412 is linked to the relief valve 402 by the arm weldment 408. Once pressure is released, the proximal end 442 of the arm 412 extends further outwardly from the axis 20 such that rotational torque applied through the arm 412 to the lid assembly 400 is increased to ease rotation and removal of the lid assembly 400. Preferably, the arm 412 is used to rotate the lid assembly 400 from 5 degrees to 365 degrees with respect to the axis 20 for removal of the lid assembly 400. The lid assembly 400 also includes a magnet 432, bonded to the bottom portion 418, which provides magnetic attraction to the lid 110 to assist in maintaining the lid 110 closed.

FIGS. 6A-6F illustrate the lid assembly 400 wherein the arm 412 is located in the radial slot 414 in the closed position. As a result, the arm 412 allows the relief valve 402 to be closed because the poppet 461 is unencumbered in the channel 446 (shown in FIG. 5A). When the filtration system 100 is in the closed position, the arm 412 is preferably in the first side 431 of the radial slot 414 with the proximal end 442 of the arm 412 slightly protruding for easy grip. A distal most end 443 of the arm weldment 408 is substantially horizontal in the second side 433 of the radial slot 414 so that the arm weldment 408 does not exert force on the relief valve 402.

FIG. 3A also shows the lid assembly 400 in a closed position. To move from the closed position to the relieve position, the arm 412 is flipped along arrow "f" as shown in FIG. 3B. As noted above, the proximal end 442 of the arm 412 may extend slightly for easy grip by the user to start the flipping action. As the arm 412 rotates, the distal end 440 of the arm 412 swings through the hollow 419 for clearance to arrive in the relieve position shown in FIGS. 5A and 7A-7E.

To release the internal pressure in the relieve position with flow turned off by the manifold 10, the arm 412 is manually pressed downward to open the relief valve 402. In detail, the proximal end 442 of the arm 412 extends out of the second side 433 of the radial slot 414 so that when manually pressed, the arm 412 seesaws on the cap 410 with the distal end 440 moving upward. This seesaw movement forces the push bracket 444 to press against the arm weldment 408. Since the arm weldment 408 is also connected to the arm 412 with the pin 422, the distal end 443 of the arm weldment 408 lifts upward and, in turn, the poppet 461 of the relief valve 402 moves upward to open the relief valve 402. As a result, the internal pressure of the vessel 204 is free pass into the release passageway 460 of the seal stem 404, into the distal inlet 462 of the relief valve 402, out the outlet 463 of the relief valve 402 to the surrounding environment via the throughhole 420. The user can use the arm 412 to hold the relief valve 402 open for a time so that the internal pressure is released. It is envisioned that under high pressure, the user would hear gas and/or see water released. Once the internal pressure is released, the arm 412 can be relaxed and the relief valve 402 will automatically close.

Upon release of the internal pressure, the arm 412 extends further outwardly from the axis 20 such that torque applied through the arm 412 to the lid assembly 400 is increased to ease rotation of the lid assembly 400 along arrow "r" as shown in FIG. 3C. The rotation is further eased by having the seal plate 406 rotate independently so that the friction of the o-ring 411 need not be overcome. As the access cap 410 is threaded onto the top housing 204, the internal pressure that remains may assist in rotating the access cap 410 along arrow "r" as well. Preferably, the arm 412 and radial slot 414 are sized and configured so that the rotational force of the arm 412 is carried substantially if not completely by the sidewall 429 to avoid torque on the arm weldment 408.

Once fully rotated counterclockwise, the access cap 410 is in a removal position. The arm 412 is configured to act as a handle to remove the lid assembly 400 by lifting the lid assembly 400 upward from the top housing 204 of the pressure vessel 106. As shown in FIG. 3D, the filter cartridge 200 can be removed from the pressure vessel 106 once the lid assembly 400 is removed (e.g., in the open position).

Referring now to FIGS. 8A-8C and 9A-9D, components of another embodiment in accordance with the subject technology are shown. Similar elements to those described in connection with above-described embodiments are indicated with the like reference numbers in the "800" series. Many elements are similar or the same as those of the foregoing embodiments and, thus, are not further shown or described herein. A primary difference between the embodiment of FIGS. 8A-8C and 9A-9D is the rotational interference-fit structures between the top housing 804 and filter access cap 810, which are shown in isolation.

Figure 8B:
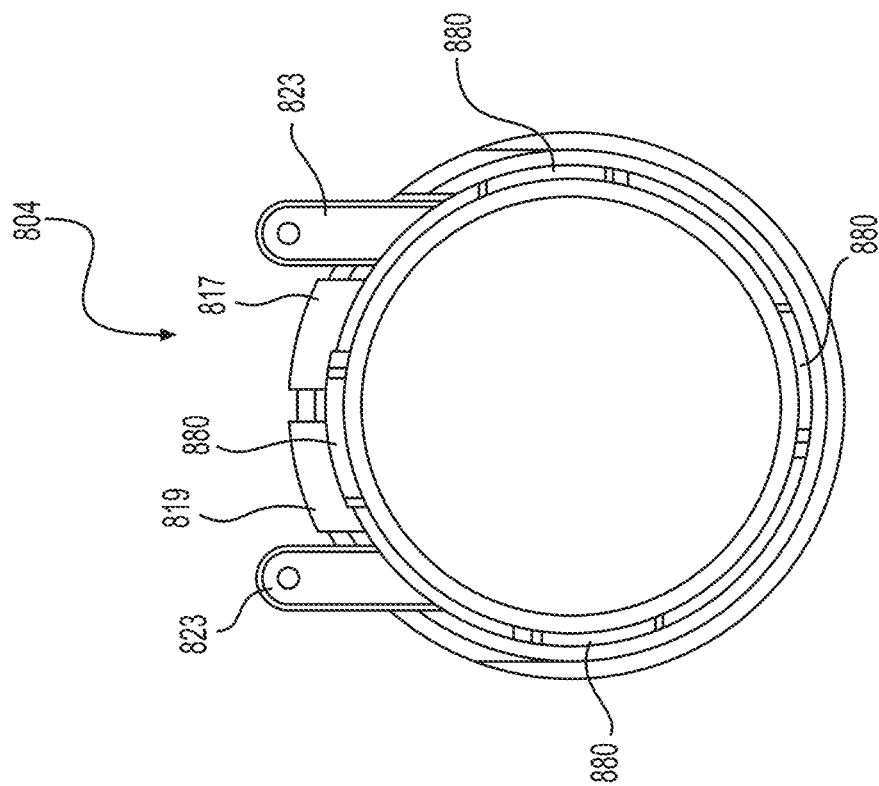
FIGS. 8A-8C illustrate various views of another top housing, according to certain embodiments.
Figure 8A:
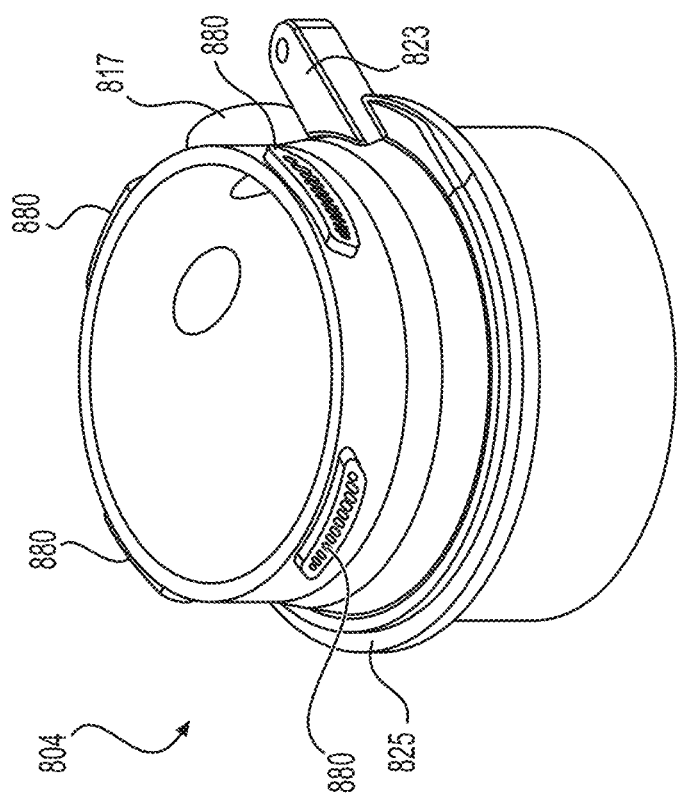
Figure 8C:
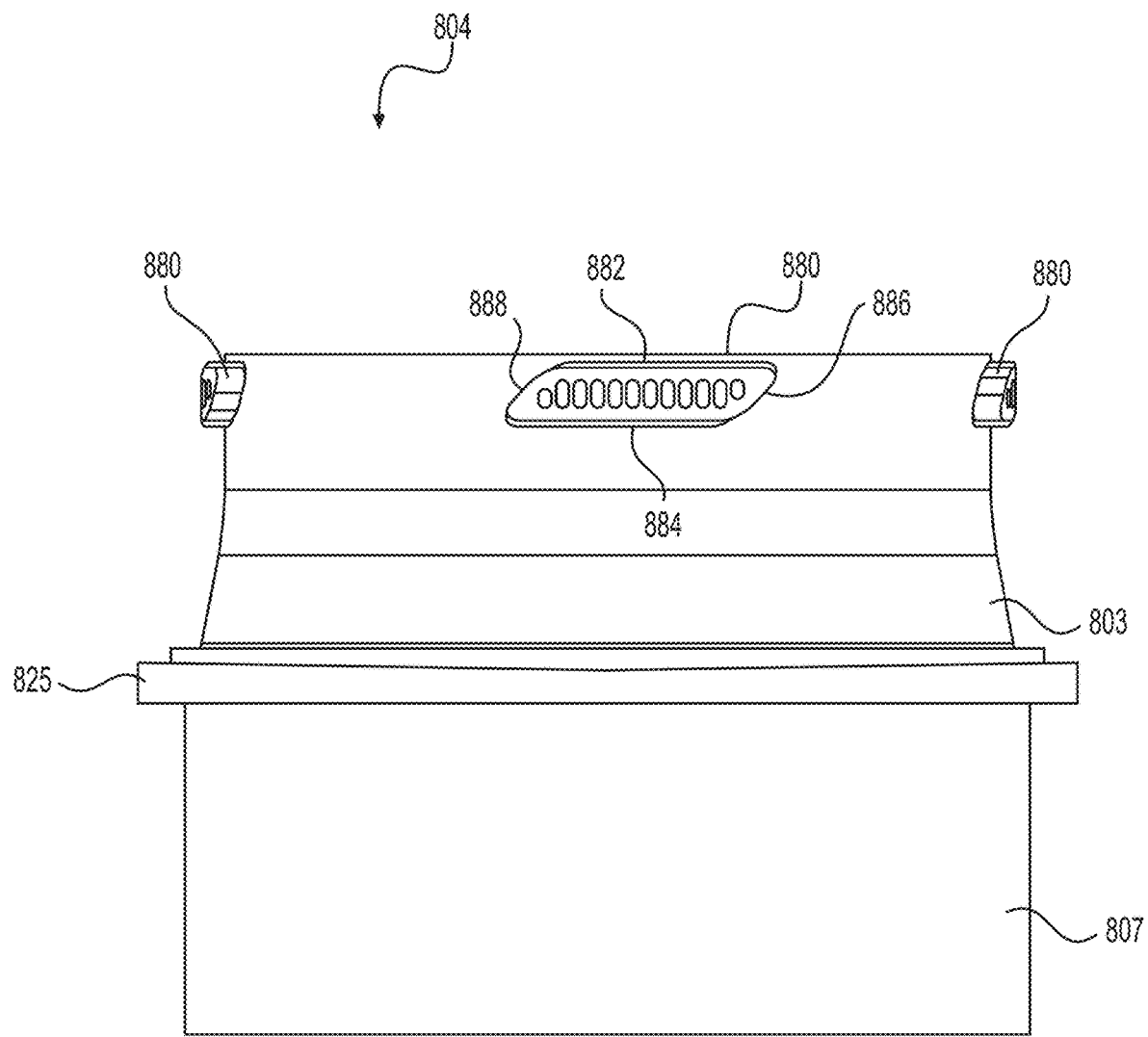

FIGS. 8A-8C illustrate the top housing 804 for the pressure vessel 106, according to certain embodiments. The rotational interference-fit structures of the top housing 804 include a plurality of elongated outer bosses 880. In some embodiments, the top housing 804 includes four outer bosses 880 but more or fewer may be utilized. Each boss 880 has a central locking portion 882 with a lower surface 884 for retaining the filter access cap 810 thereto. Each boss 880 also has a first angled end 886 to provide a banking surface that acts as a rotational end-stop when coupling the filter access cap 810 on to the top housing 804. A second angled end 888 of each boss 880 provides a banking surface to assist with removal of the filter access cap 810 from the top housing 804.

Figure 9B:
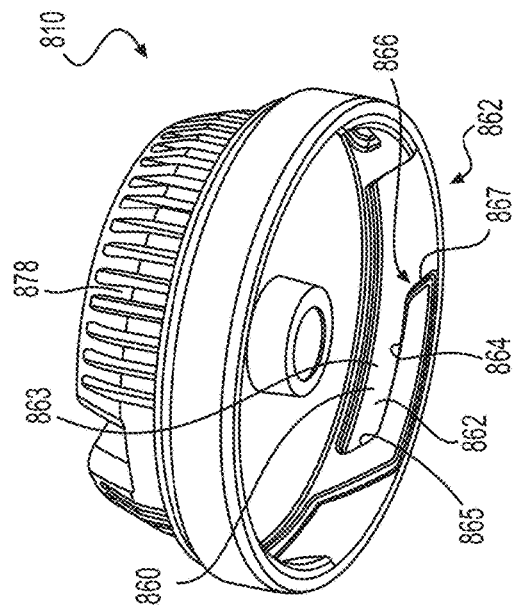
FIGS. 9A-D illustrate various views of another filter access cap in isolation, in accordance with the subject technology and for use with the top housing of FIGS. 8A-C.
Figure 9D:
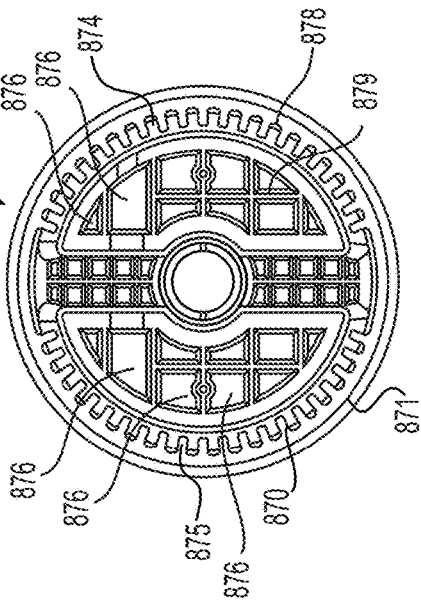
Figure 9A:
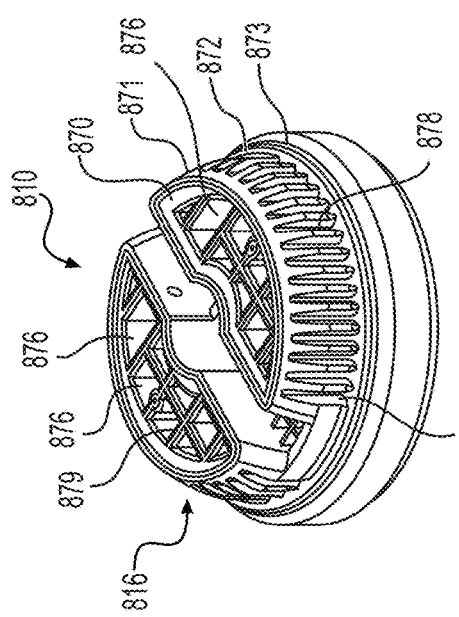
Figure 9C:
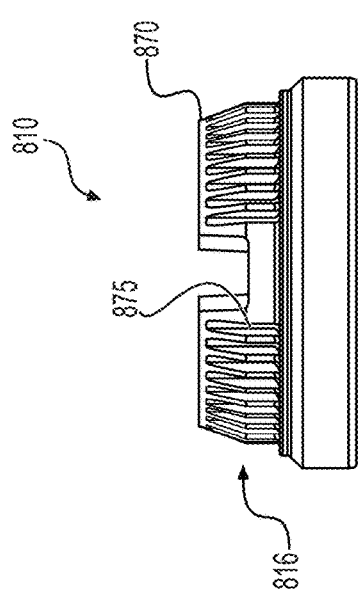

FIG. 9A-9D illustrate various views of the filter access cap 810. The rotational interface structures of the lid assembly 800 also include a plurality of inner slots 860 formed in the filter access cap 810 as best seen in FIG. 9B. Each inner slot 860 captures a respective boss 880 of the top housing 804. Each inner slot 860 has an opening 862 for ingress and egress of the boss 880. The opening 862 leads to a capture area 863 that has a substantially horizontal ledge 864 that mates against the lower surface 884 of the boss 880 to retain the filter access cap 810. When the filter access cap 810 is fully inserted in the capture area 863 (e.g., rotated fully clockwise), the first angled end 886 of the boss 880 comes to a stop against a complimentary slot end 865. A transition area 866 extends between the opening 862 and the capture area 863. The transition area 866 has an angled edge 867 to engage the second angled end 888 of the respective boss 880 to convert the rotational force during removal and the upward force from internal pressure into upward lifting force when removing the filter access cap 810 (e.g., rotating the filter access cap 810 counterclockwise). Similarly, the transition area 866 can have a second angled edge (not explicitly shown) opposing the first angled edge 867 that engages the first angled end 886 of the boss 880 during clockwise rotation to assist with downward motion of the filter access cap 810 while being mounted on the top housing 804.

Still referring to FIGS. 9A-D, the top portion 816 of the filter access cap 810 has a top surface 870 with a top edge 871 and a bottom surface 872 with a bottom edge 873. A circumferential surface 874 extends from the top edge 871 to the bottom edge 873. The circumferential surface 874 has a plurality of openings 875 intermediate ribs 878. Further, the top portion 816 of the filter access cap 810 has a plurality of openings 876 defined between ribs 879 of the top surface 870 and the bottom surface 872. The plurality of ribs 878, 879 provide sufficient strength to the lid assembly 400 to tolerate the force during the opening of the pressure vessel 106 and removal of the filter cartridge 200, i.e., during the open position, the relieve position and the removal position.

FIGS. 10A-10C illustrate the lid assembly 800 attached to the top housing 804 in isolation. The lid assembly 800 of FIGS. 10A-10C is shown in the relieve position. The lid assembly 800 again includes the access cap 810. Although the access cap 810 is different, the operation is unchanged. In more detail, the sequence of FIGS. 3A-D illustrating the steps to remove a filter cartridge 200 from the filtration system 100 would still be followed. Again, in order to access an interior of the pressure vessel, the top cover of the filtration system is opened. The pressure lid assembly 800 has the arm 812 in a closed position, which is required to close the top cover 110. In the closed position, the filter cartridge 200 is sealed fluid tight in the pressure vessel interior.

To release the pressure inside the pressure vessel, the arm 812 is rotated or flipped up from the closed position to the relieve position. Although the internal pressure may push the filter cap 810 upward, the lower surface of the boss 884 against the ledge 864 of the slot 860 prevents the filter cap 810 from moving upward. In the relieve position, the arm 812 is manually depressed to actuate the relief valve to release the internal pressure while having the access cap 810 still sealingly coupled to the top housing 804.

Once internal pressure is released, the arm 812 can be more easily and safely turned 45 degrees (e.g., ¼ turn) so that the bosses 880 approach the respective openings 862. As noted above, when the angled ends 886, 888 meet and slide across the angled edges 867, any remaining internal pressure plus the rotation force converts into a lifting force. Once the bosses 880 pass out of the slot openings 862, the lid assembly 800 can be lifted by the arm 812 from the top housing 804 for access to the filter cartridge, which can be removed from the pressure vessel. Advantageously, the arm 812 acts as a lever for rotating and handle for easy removal of the access cap 810. As shown in FIG. 3D, the filter cartridge 200 also includes a handle 240 for easy control by the user.

To replace the lid assembly 800 on the top housing 204, the bosses 880 are aligned with the respective openings 862 and the access cap 810 is pressed downward. Again, the angled ends 886, 888 meet and slide across the angled edges 867 starting the rotational movement. The arm 812 is rotated clockwise so the bosses 880 pass through the respective slot 860 until the slot ends 865 are reached. The bosses 880 being so captured in the slots 860 insures that the lid assembly 800 will remain in place despite high pressure during operation. The arm 812 is rotated up and pressed down so that the arm 812 again is away from accidental actuation in the radial slot 814. The radial slot 814 may retain the arm 812 when rotated through a friction fit and/or other features such as snap-fit features to provide affirmative tactile response to the user that the closed position is fully engaged. The top cover may also be configured so that closing of the top cover may not be possible if the arm 812 is not properly set in the closed position. Preferably, the arm weldment 808 is configured and arranged to set the arm 812 securely in the closed position.

In various embodiments, the lid assembly can be turned from 5 degrees to 360 degrees for removal. In an alternative embodiment, the arm may telescope/slide in and out of the top slot to actuate the relief valve and become a longer handle for rotation. In still another embodiment, the arm may rotate on a more centrally located pin so that a distal bottom of the arm actuates the relief valve during rotation such as by directly or through a linkage pulling or depressing the poppet of the relief valve.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

The invention claimed is:

1. A filtration system, comprising:
a pressure vessel having an opening;
a filter cartridge received in the pressure vessel, wherein the titter cartridge is adapted to be inserted into and removed from the pressure vessel through the opening;
a lid assembly sealing the opening of the pressure vessel when secured to the pressure vessel, and further comprising a filter access cap having a top portion, a bottom portion, and a tubular portion extending from the top portion to the bottom portion to define a throughhole, the top portion having a radial slot;
rotational interference-fit structures securing the lid assembly to the pressure vessel when engaged, whereby rotation of the lid assembly in a first direction about an axis with respect to the pressure vessel engages the rotational interference-fit structures while rotation in a second direction disengages the rotational interference-fit structures;
a relief valve coupled to the lid assembly for selectively releasing non-atmospheric pressure from the pressure vessel when opened;
an arm operatively engaging the relief valve and having a distal end pivotally secured to the lid assembly, whereby when the arm is pivoted in a first direction, the relief valve opens and a proximal end of the arm extends further outwardly from the axis such that torque applied through the arm to the lid assembly is increased to ease rotation of the lid assembly wherein:
in a closed position, the arm allows the relief valve to be closed;
in a relieve position, the arm is manually pressed to open the relief valve and, thereby, relieve the pressure; and
in a removal position, the arm is configured to act as a handle to remove the lid assembly from a top housing; and
an arm weldment having: a proximate end rotatable pinned to the distal end of the arm; and a distal end rotatable pinned to the pressure relief valve, wherein:
the radial slot has a first side and a second side of a same length;
the arm is longer than the same length;
in the closed position, the proximal end of the arm is substantially in the first side of the radial slot and the proximal end of the arm weldment is in the second side of the radial slot so that the arm weldment does not exert a force on the relief valve; and
in the relieve position, the proximal end of the arm extends out of the second side of the radial slot so that when manually pressed, the arm weldment pulls on the relief valve and, thereby, opens the relief valve.

2. The filtration system of claim 1, wherein the rotational interference-fit structures comprise screw threads, the arm is connected to the relief valve, the pressure vessel includes: a bottom housing; a middle housing being attached to the bottom housing and configured to contain the filter cartridge; and a top housing being attached to the lid assembly, and further comprising a manifold attached to the pressure vessel for controlling flow into the pressure vessel.

3. The filtration system of claim 1, wherein the lid assembly comprises:
a seal plate assembly connected to the bottom portion of the filter access cap and configured to rotate relative to the filter access cap to assist in removing the lid assembly from the pressure vessel; and
a seal stem located in the throughhole, wherein the relief valve is mounted in the seal steam and the arm is located in the radial slot.

4. The filtration system of claim 3, wherein the rotational interference-fit structures comprises a plurality of inner slots in the filter access cap for capturing a plurality of outer bosses on the pressure vessel.

5. The filtration system of claim 4, wherein: each inner slot has an angled opening, a capture area and a transition area extending between the angled opening and the capture area; and each outer boss is sized to pass through the angled opening for retention in the capture area as well as having a banking surface to engage the angled opening to provide lifting force when removing the filter access cap.

6. The filtration system of claim 1, wherein the radial slot has a hollow for movement of the proximal end of the arm.

7. The filtration system of claim 1, wherein the arm is pivoted in the first direction the relief valve opens and the proximal end of the arm extends further outwardly from an axis such that torque applied through the arm to the lid assembly is increased to ease rotation of the lid assembly.

8. The filtration system of claim 1, wherein the radial slot comprises:
a first side and a second side, and the second side of the radial slot forms a hollow wherein the hollow allows for increased range of motion when the arm is pivoted in a the first direction.

9. A filtration system, comprising:
an elongated pressure vessel having an opening; and
a lid assembly selectively scaling the opening of the pressure vessel, wherein the lid assembly includes:
a filter access cap forming a radial slot and having rotational interference-fit structures securing the lid assembly to the pressure vessel;
a relief valve configured to selectively release non-atmospheric pressure from the pressure vessel;

an arm coupled to the relief valve, whereby in a relieve position, the arm can actuate the relief valve to open and a proximal end of the arm can rotate to press against sidewalls of the radial slot to release the rotational interference-fit structures and remove the lid assembly from the elongated pressure vessel;

an arm weldment having: a first end rotatably pinned to near the distal end of the arm and a second end rotatably pinned to the pressure relief valve; and a plate assembly: connected to the filter access cap and carrying an o-ring to seal the lid assembly to the elongated pressure vessel; and configured to rotate relative to the filter access cap to assist in removing the lid assembly from the pressure vessel.

10. The filtration system of claim 9, further comprising:
a push bracket on the distal end of the arm so that when manually pressing the proximal end of the arm to pivot against the filter access cap, the push bracket causes the arm weldment to rigidly align as an extension of the arm.

11. A filtration system, comprising:
a pressure vessel having an opening;
a filter cartridge received in the pressure vessel, wherein the filter cartridge is adapted to be inserted into and removed from the pressure vessel through the opening;
a lid assembly sealing the opening of the pressure vessel when secured to the pressure vessel, the lid assembly having a filter access cap;
rotational interference-fit structures securing the lid assembly to the pressure vessel when engaged, whereby rotation of the lid assembly in a first direction about an axis with respect to the pressure vessel engages the rotational interference-fit structures while rotation in a second direction disengages the rotational interference fit structures;
a normally closed relief valve coupled to the lid assembly for selectively releasing non-atmospheric pressure from the pressure vessel when opened; and
an arm having a distal end coupled to the relief valve, wherein in a relieve position, the arm has a proximal end extending radially outward from the filter access cap so that manually pressing the proximal end causes the arm to pivot against the filter access cap so that the distal end opens the relief valve and, thereby, relieves the non-atmospheric pressure, an arm weldment having: a first end rotatably pinned to near the distal end of the arm and a second end rotatably pinned to the pressure relief valve; and a push bracket on the distal end of the arm so that when manually pressing the proximal end of the arm to pivot against the filter access cap, the push bracket causes the arm weldment to rigidly align as an extension of the arm.

12. The filtration system of claim 11, wherein the rotational interference-fit structures comprise screw threads, the pressure vessel includes: a bottom housing; a middle housing being attached to the bottom housing and configured to contain the filter cartridge; and a top housing being attached to the lid assembly, and further comprising a manifold attached to the pressure vessel for controlling flow into the pressure vessel.

13. The filtration system of claim 11, wherein the filter access cap includes a top portion having a radial slot, the arm being in the radial slot in the relieve position and the radial slot being sized and configured to carry rotational force of the arm when using the arm to rotate the lid assembly.

14. The filtration system of claim 13, wherein the rotational interference-fit structures comprises a plurality of inner slots in the filter access cap for capturing a plurality of outer bosses on the pressure vessel, wherein: each inner slot has an angled opening, a capture area and a transition area extending between the angled opening and the capture area; and each outer boss is sized to pass through the angled opening for retention in the capture area as well as having a banking surface to engage the angled opening to provide lifting force when removing the filter access cap.

* * * * *